United States Patent [19]

Wilson et al.

[11] 4,336,632
[45] Jun. 29, 1982

[54] CONTINUOUS SHIRRING AND SPINNING APPARATUS FOR CASINGS

[75] Inventors: Willard T. Wilson; Harold H. Martinek, both of Danville, Ill.; Thomas W. Martinek, Covington, Ind.; Alfred D. Story, Danville, Ill.

[73] Assignee: Teepak, Inc., Chicago, Ill.

[21] Appl. No.: 147,774

[22] Filed: May 8, 1980

[51] Int. Cl.³ .............................................. A22C 13/02
[52] U.S. Cl. .......................................... 17/1 R; 17/42; 17/49; 53/576
[58] Field of Search ................. 17/41, 42, 49; 53/567, 53/576

[56] References Cited

U.S. PATENT DOCUMENTS

3,594,857  7/1971  Michl ..................................... 17/42
4,185,358  1/1980  Regner .................................. 17/42

Primary Examiner—Willie G. Abercrombie
Attorney, Agent, or Firm—Charles E. Brown

[57] ABSTRACT

This relates to a machine for shirring tubular films such as those used for sausage casings and the like. In accordance with this disclosure, the films are continuously fed onto a mandrel where they are opened from their flat state and then are fed at a selected rate through a shirring head. The shirred casing is then gripped and advanced in a manner so as to control the density thereof and to impart a spin thereto as desired.

15 Claims, 14 Drawing Figures

CONTINUOUS SHIRRING AND SPINNING APPARATUS FOR CASINGS

This invention relates in general to new and useful improvements in casing shirring machines for shirring casings for sausages and the like, and more particularly to a shirring machine which is capable of continuously shirring a casing while at the same time spinning the casing.

It is known continuously to shirr casings. However, it has been found that it is desirable also to spin such casings as they are being continuously shirred. The spinning of such casings is generally necessitated by the fact that if there are any irregularities in either the wall thickness of the casing or in the spinning operation, the resultant shirred casing will have a bow, and accordingly straight casing sticks or strands cannot be obtained.

In accordance with this invention it is proposed to shirr a casing in a conventional manner and then to control the density of the shirred casing by a suitable hold back mechanism which may also, at the same time, impart to the shirred casing the desired spin.

Most specifically, in accordance with this invention it is proposed to provide a shirred casing hold back device and a spinning apparatus which will control the density of the shirred casing and impart thereto the necessary spin.

In accordance with this invention it is proposed to provide a hold back device in the form of a pair of endless belts having opposed runs which will grip the shirred casing and control the advance thereof. It is also proposed to so mount the two belt conveyors within a support which may be rotated about the axis of the shirred casing to impart a controlled spin to the shirred casing.

It is also proposed to provide a drive arrangement for separately effecting the driving of the belt conveyors and the spinning of the belt conveyor unit with a change in the spinning rate or direction in no way affecting the rate of movement of the belt conveyors.

With the above and other objects in view that will hereinafter appear, the nature of the invention will be more clearly understood by reference to the following detailed description, the appended claims, and the several views illustrated in the accompanying drawings.

Figure 1A:
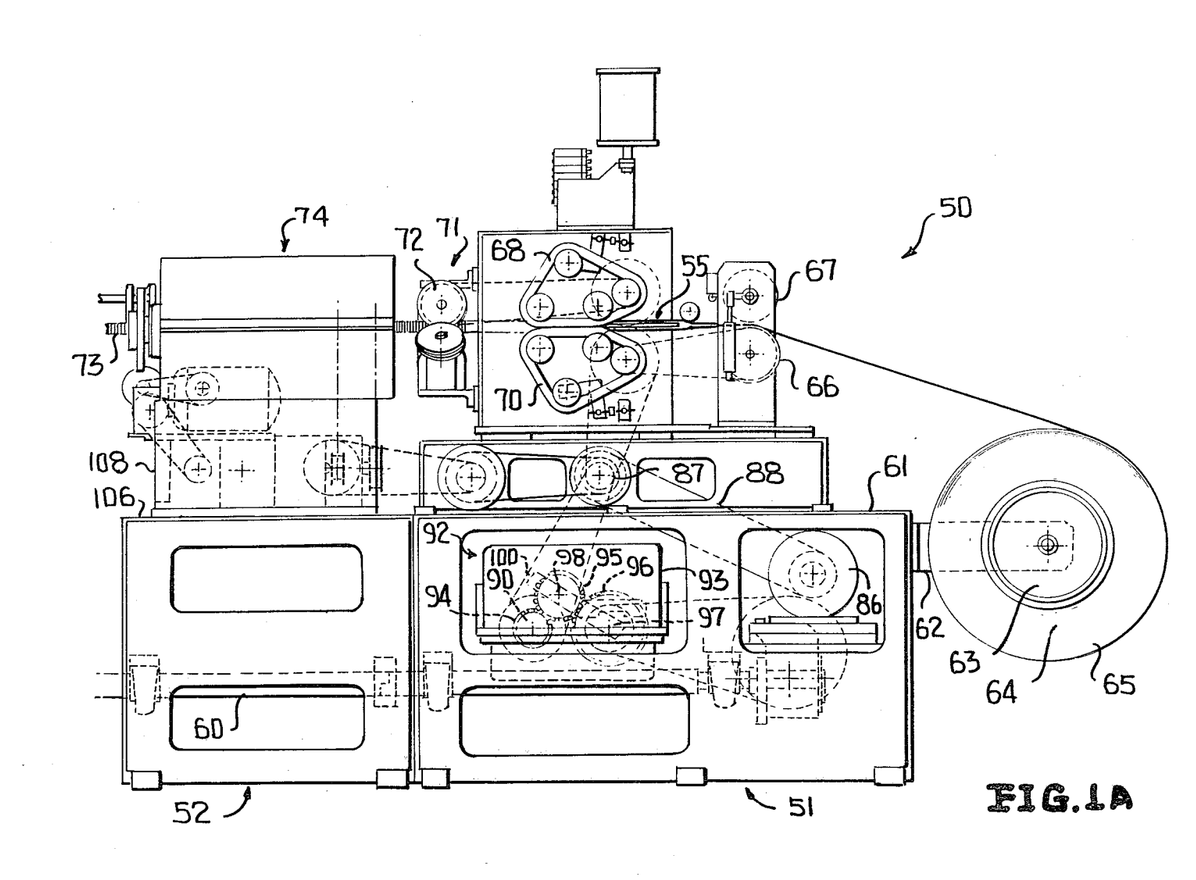
FIGS. 1A and 1B are side elevational views of the continuous casing shirring machine showing the general details thereof.
Figure 1B:
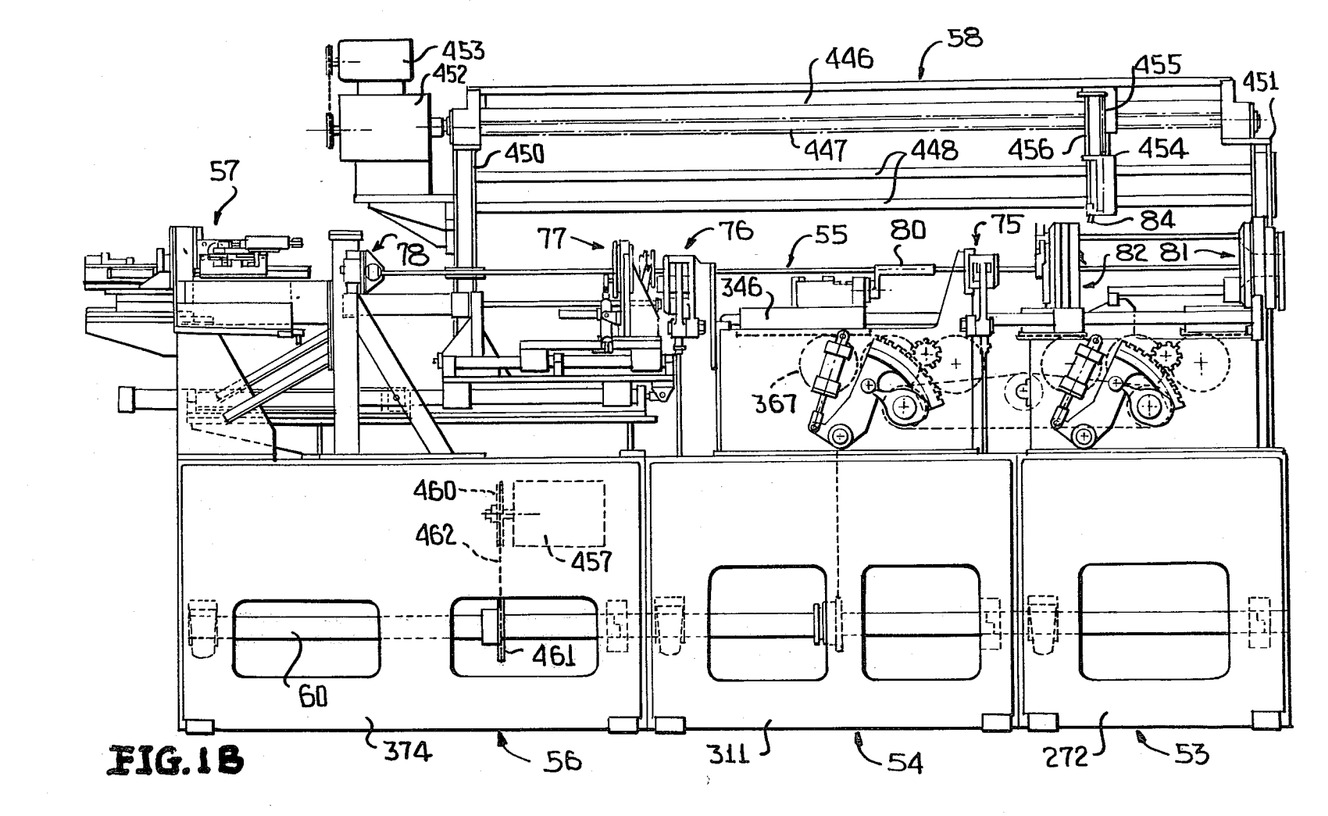
Figure 2:
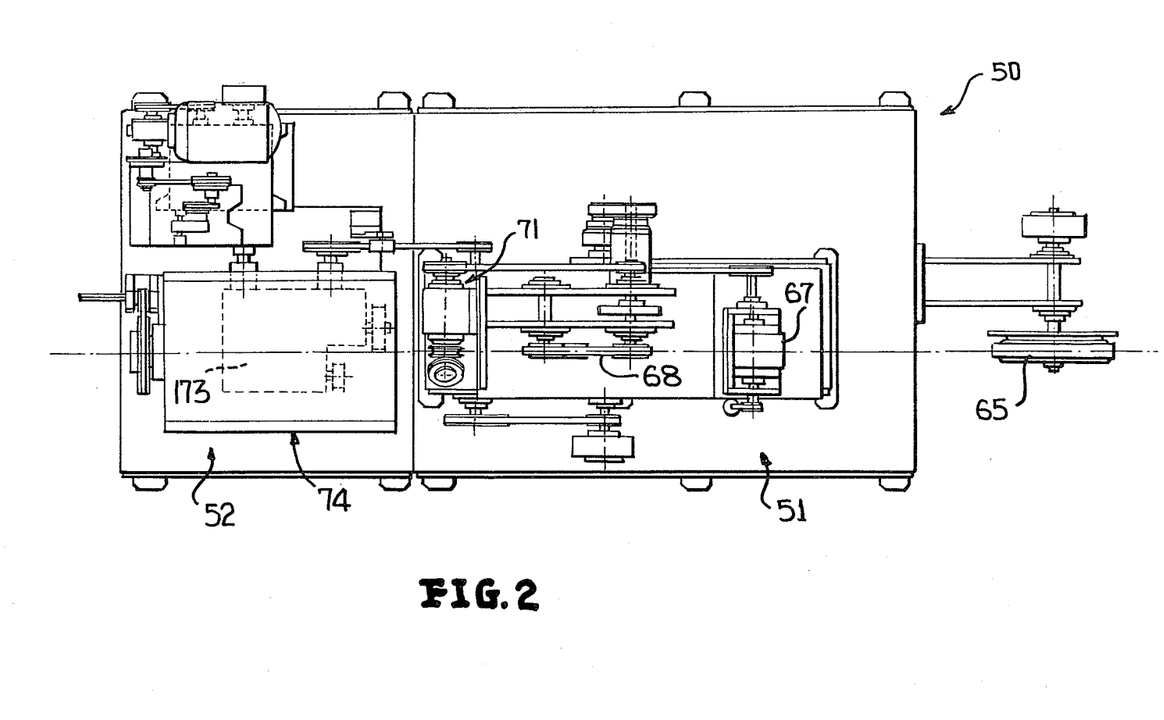
FIG. 2 is a plan view of the front end of the machine.

Referring now to the drawings in detail, reference is first made to FIGS. 1A, 1B and 2 wherein the general details of the continuous casing shirring and spinning machine are illustrated, the machine being generally identified by the numeral 50. The machine is formed of a plurality of replaceable units which include a casing feed and shirring unit 51 located at the head of the machine. Next, there is a combined shirred casing hold back and density control unit 52. This is followed by a casing separator unit 53 which receives the density controlled shirred casing and separates it into individual strands of regulated lengths. When desired, there is next an auxiliary hold back unit 54 which also carries clamp type supports for the mandrel in a manner to be described in detail hereinafter, the mandrel being generally identified by the numeral 55.

The next unit is a casing compressor and doffer unit generally identified by the numeral 56. This unit has associated therewith a combined strand handler and end closer unit 57.

Bridging generally between the units 53 and 56 is a transport device 58 for transporting a separated shirred casing strand from the casing separator device 53 into the combined casing compressor and doffer device 56.

All of the units are driven in timed relation under the control of a main drive shaft 60 which extends the length of the machine.

Referring specifically to FIGS. 1A and 2, it is to be understood that basically the unit 51 is conventional and forms no part of this invention. The unit 51 includes a mounting base 61 which has extending forwardly from the front end thereof a support 62 for a reel holder 63 which, in turn, is adapted to have received thereon a reel 64 of flat casing. The casing, 65, is in the form of a tubular film of collagen or cellulose which are extensively used as a sausage casing. The film is initially formed as a continuous tube and is rolled flat. The flat film is fed through a nip defined by a metering roll 66 and a back-up roll 67 onto the forward end of the mandrel 55 wherein it is automatically opened and is internally pressurized by a combined air spray and lubricant or softening fluid spray.

The opened casing 65 is then fed along the mandrel 55 at a controlled rate by a pair of opposed drive belts 68, 70 in a conventional manner. The casing 65 next passes through a shirring head 71 which includes a plurality of conventional shirring wheels 72 which radially inwardly fold or shirr the casing so that many feet of the casing may be compressed into a relatively short space. For example, eighty feet of the casing may eventually be compressed into a stick or strand having a length on the order of thirteen inches.

The shirred casing, identified by the numeral 73, then passes into a combined casing hold back and density control device 74 which is part of the density control unit 52. The device 74 receives the shirred casing and permits the shirred casing to be advanced at the same rate as it is shirred by the shirring head 71. The device 74 is also mounted for rotation about the axis of the mandrel so as to impart a spin to the shirred casing 73 as desired. The density control device 74 may be selectively rotated in opposite directions either continuously or alternately so as either continuously to spin the casing in a selected direction or first to spin the casing in one direction and then in the opposite direction so as effectively to cancel the spin in the overall length of the casing.

Referring now to FIGS. 1B and 2, the density controlled shirred casing is directed to the unit 53 which at timed intervals is operated to grip an intermediate portion of the shirred casing with one set of fingers holding back the casing and the other advancing the casing to tear off or segregate a leading portion of the casing into individual sticks or strands of controlled length.

At this time it is pointed out that while the mandrel 55 is generally supported at spaced intervals along its length by various components of the machine 50, there are two sets of mandrel support clamp assemblies 75 and 76. The mandrel support clamp assemblies 75 and 76 serve to introduce into the mandrel 55 in a known manner separate streams of air and lubricating or casing softening liquids. One of the support clamp assemblies 75 and 76 remains closed at all times and is separately openable to permit a separated casing strand to be advanced along the mandrel 55 to the device 56 for first compressing the strand and then doffing the strand from the tail end of the mandrel.

The auxiliary hold back device 54, when utilized, engages the advancing end of the shirred casing 73 and cooperates with the combined casing hold back and separator device 53 to maintain the density of the shirred casing.

When a casing strand is separated, it is engaged by the transporter 58 and transported first to an intermediate position between the mandrel support clamps 75, 76 and then through the mandrel support clamp 76 and a head of the shirred casing compressor and doffer unit 56 for an operation thereon by the device 56.

The combined casing compressor and doffer unit 56 includes a travelling head 77 which, in association with an openable stop assembly 78 first functions to compress a casing strand and then to doff the casing strand from the mandrel 55 and deliver it to the strand holder and closer unit 57.

Figure 3:
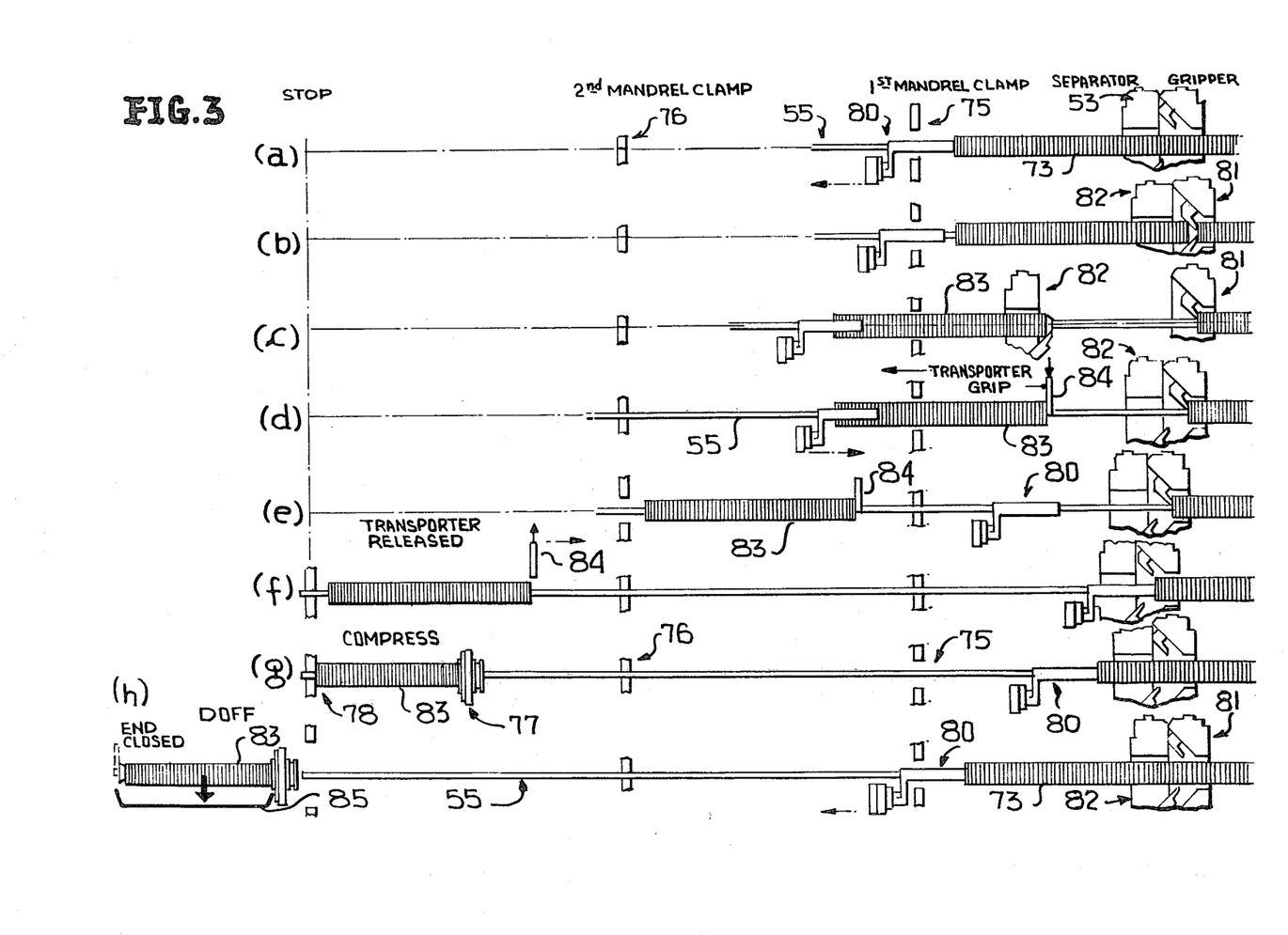
FIG. 3 is a schematic view showing the sequence of operation of the machine.

Reference is now made to the schematic showing of FIG. 3. It will be seen that with the mandrel support clamp 75 open and the mandrel support clamp 76 closed, the shirred casing 73 is advanced through the combined casing hold back and separator device 53 and a preselected length of the shirred casing has passed through the device 53. At this time, when the auxiliary hold back device 54 is used, a hold back head 80 of the auxiliary hold back device 54 will generally surround the mandrel 55 and permit the leading end of the shirred strand 73 to be advanced at the same rate as it is permitted to be advanced by the density control device 52.

At a controlled time, the head 80 will open and also begin rapidly to retract. At the same time the shirred casing will be gripped and held back by a hold back unit 81 of the device 53 while in the same plane as the unit 81, the shirred casing is also engaged by a separator unit 82 of the device 53. For a short period of time the units 81, 82 will be moved in unison, after which the unit 82 will be rapidly advanced as shown in FIG. 3c to pull apart an intermediate portion of the shirred casing 73 and to be able to separate from the continuously shirred casing a strand or stick 83. The separator unit then returns to its position adjacent the hold back unit 81, leaving the separated strand 83 advanced on the mandrel 55. The mandrel 55 is then loosely engaged by a pusher element 84 of the transporter 58 the separated strand 83 moved to a position intermediate the mandrel support clamps 75, 76 as shown in FIG. 3e. At this time the support clamp assembly 75 closes, followed by the opening of the support clamp assembly 76 so that the casing strand 83 may again be transported along the mandrel 55.

Following the separation of the strand 83, it will be seen that the hold back unit 81 continues to engage the leading end of the shirred casing and cooperates with the density control device 74 to maintain the controlled density of the shirred casing.

The auxiliary hold back device, when utilized, next advances the head 80 thereof to engage the leading end of the shirred casing and the hold back unit 81 releases the leading end of the shirred casing so that the shirred casing may now pass through both the hold back unit 81 and the separator unit 82 under the control of the auxiliary hold back unit 54.

In the meantime, the casing strand 83 is being operated on by the combined casing compressor and doffer unit 56. The stop 78 is closed and the head 77 engages the trailing end of the separated casing strand 83 and serves to compress the strand to the desired length. For example, the strand of controlled density may have had a length on the order of twenty-five inches when initially separated from the following shirred strand portion and is compressed to a length on the order of nineteen inches.

If desired, while the strand is being compressed, the head 77 may be oscillated or rotated about the mandrel 55 to shape the trailing end of the strand 83 to repair any minor deformation which may have occurred during the separation of the strand.

The stop 78 is then opened and the head 77 is further moved along the mandrel to doff the compressed strand 83 from the mandrel 55. The doffed strand is then received by a strand handler and closer 57 which laterally shifts the compressed strand into alignment with an end closer which is conventional, and thereafter deposit the closed strand in a receiving tray 85.

It is to be understood that the machine 50 is adjustable to receive tubular films of different diameters and different materials. Further, it is to be understood that the machine 50 is intended to supply strands of different lengths containing different footage of casing. Accordingly, it is necessary that the drive for the machine be adjustable. With reference to FIG. 1A, it will be seen that the machine 50 includes a primary drive motor 86 which drives a shaft 87 by means of a drive chain or belt 88. There is driven from the shaft 87, among other components, the shaft 60. In order to accomplish this, there is a shaft 90 which is driven from the shaft 87 by means of a drive belt or chain 91 and the shaft 90 constitutes the input for a quick change gear unit generally identified by the numeral 92. The quick change gear unit 92 includes a readily openable housing 93 into which the shaft 90 extends. The shaft carries a gear 94 with which there is meshed an intermediate gear 95 which, in turn, is meshed with a gear 96 carried by an output shaft 97. The intermediate gear 95 is carried by a shaft 98 which, in turn, is adjustable on a support 100.

The gear 94 is replaceable to change the drive radio between the shaft 90 and the shaft 97 and the shaft 98 is shifted in accordance with the selected gear diameter so that the gear 95 will mesh with the new gear 94.

Figure 4:
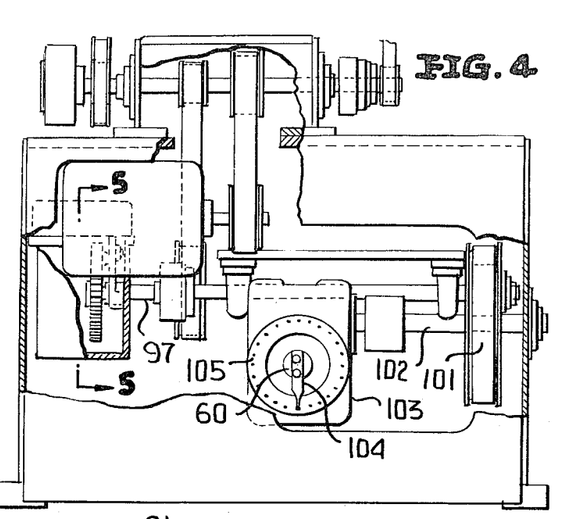
FIG. 4 is an enlarged fragmentary end view, with parts broken away and shown in section, of the forward end of the machine and shows various details of the timing mechanism.

The shaft 97 extends transversely of the machine 50, as is best shown in FIG. 4, and is provided adjacent its opposite end with a drive belt connection 101 to a shaft 102 which is coupled to a reduction gear drive unit 103. The reduction gear drive unit 103 is coupled to the forward end of the control shaft 60 for effecting the rotation thereof at a greatly reduced speed. It is to be understood that the control shaft 60 is preferably rotated one revolution for each operating cycle of the machine 50. That is, for each revolution of the shaft 60 there will be formed one shirred casing strand 83.

It is to be understood that knowledge of the exact angular displacement of the shaft 60 is critical, and accordingly there is suitably secured to the forward end of the shaft 60 or an extension thereof in the drive unit 103 a pointer 104. The housing of the drive unit 103 carries a fixed degree wheel 105. In this manner the angular displacement of the shaft 60 may be accurately related to the drive therefor.

Figure 5:
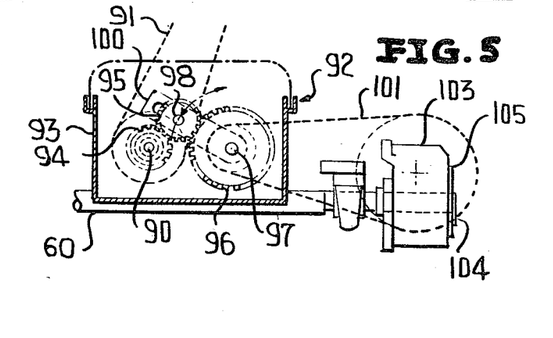
FIG. 5 is a schematic view showing details of a quick change drive assembly.
Figure 6:
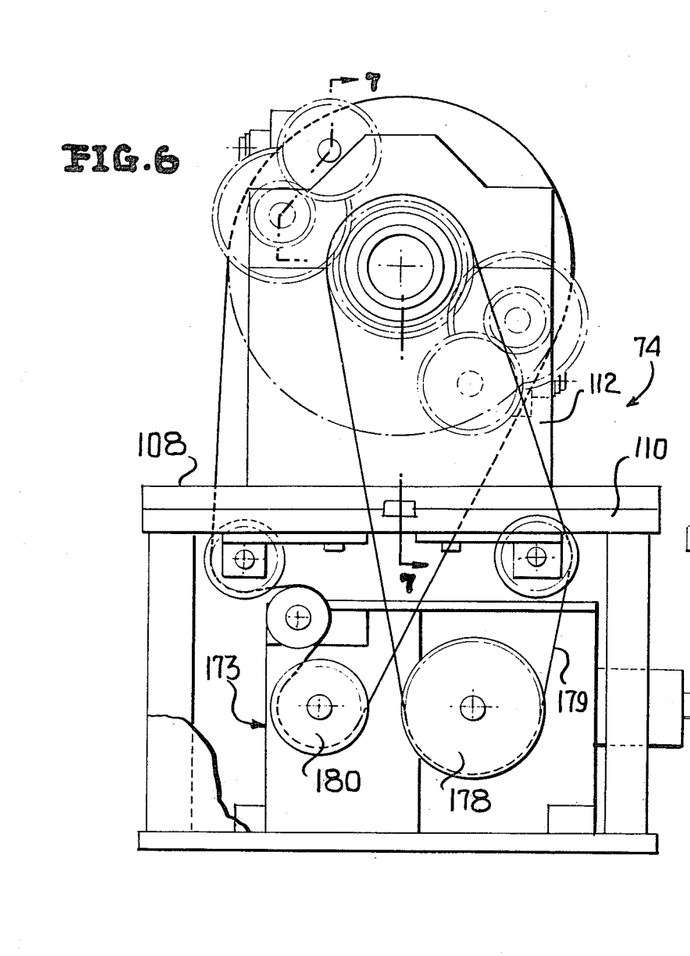
FIG. 6 is an enlarged end view of the device for holding back the shirred casing and controlling the density thereof.

With reference to FIG. 5, it will be seen that the quick change drive 92 and its coupling to the shaft 60 is schematically illustrated, and the above described parts may be best understood by reference thereto.

Referring once again to FIGS. 1A and 4, it will be seen that the drive feed measuring roll 66, the feed belts 68, 70 and the shirring head 71 is taken from the shaft 87 in a conventional manner and that the rotational speed of the shaft 60 is varied by way of the quick gear box 92 without changing the efficient operation of the casing feed and the shirring head.

Reference is now made to FIGS. 6–13 wherein the details of the combined spinning and density control unit 74 are best illustrated. First of all, as is shown in FIG. 1A, the unit 74 is mounted on a heavy base 106 through which the control shaft 60 runs and in which a section of the control shaft is mounted for rotation. The base 106 is positioned adjacent to and coupled to a heavy base 107 of a similar construction for the casing feed and shirring mechanism.

Figure 7:
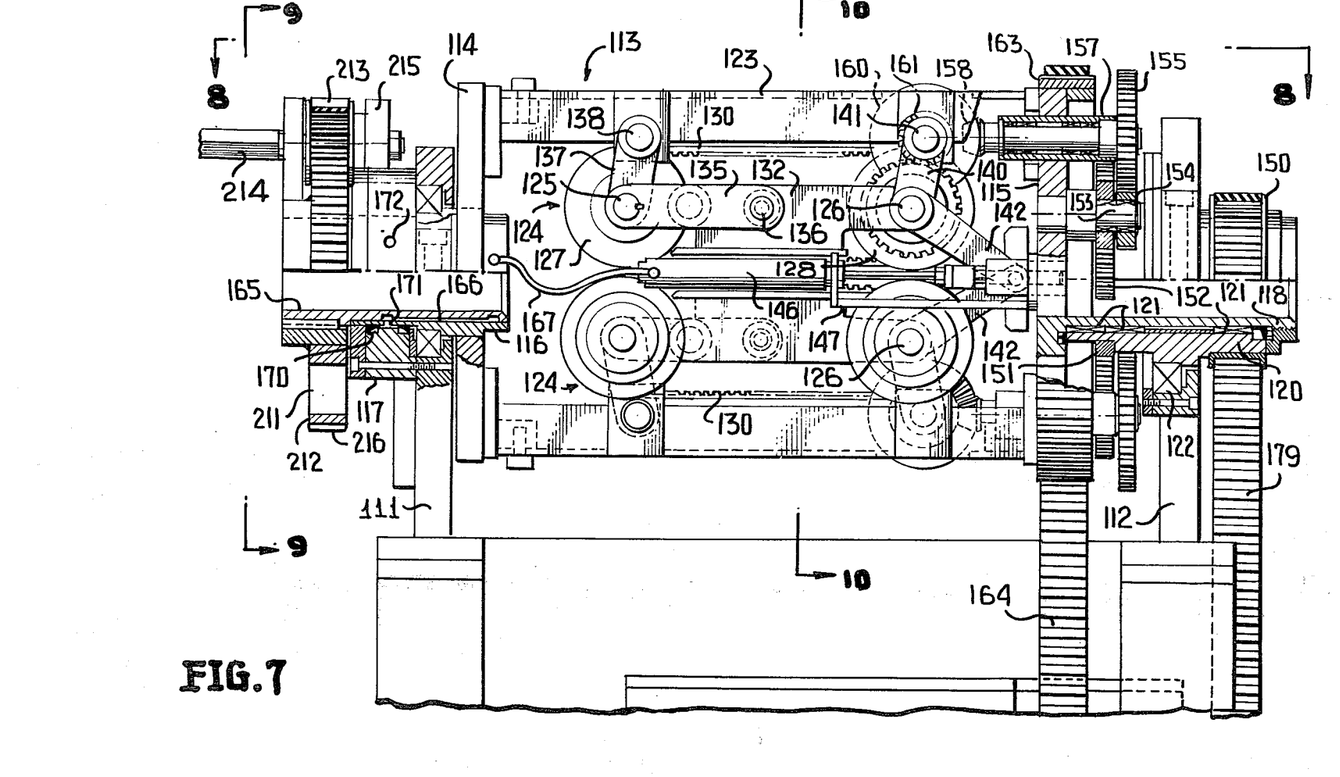
FIG. 7 is a longitudinal sectional view taken through the device of FIG. 6 generally along the line 7—7 of FIG. 6.

The combined density control and spinning device 74 includes a further supporting base structure 108 which is suitably mounted on the base 106. The supporting base structure 108 includes an upper platform 110 which has extending upwardly therefrom in longitudinally spaced relation a pair of vertical supports 111, 112. A frame, generally identified by the numeral 113, is positioned between the supports 111, 112. The frame 113 includes a pair of end plates 114, 115. The end plate 114 is provided with a tubular extension 116 which extends through the support 111 and is rotatably journalled therein by means of a bearing 117. The end plate 115 is mounted for rotation relative to the support 112 by a tubular extension 118 which, in turn, is rotatably journalled in a tubular shaft 120 by means of suitable bearings 121. The tubular shaft 120 is rotatably journalled in the support 112 by means of a bearing 122.

The frame also includes a pair of longitudinal frame members 123 (FIG. 10) which extends between and are rigidly secured to the end plates 114, 115. Each frame member 123 carries a drive belt assembly, generally identified by the numeral 124.

Figure 8:
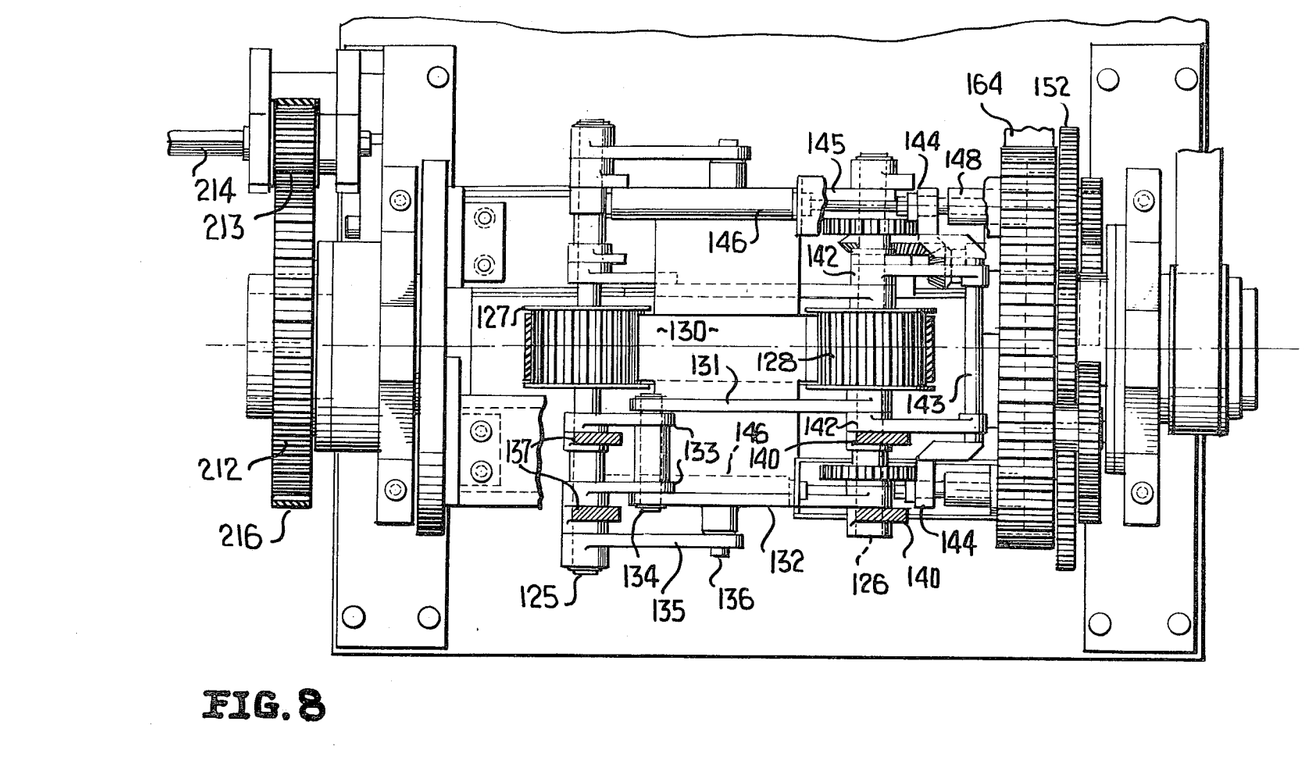
FIG. 8 is a plan view of the density controlling device of FIG. 7 taken generally along the line 8—8 of FIG. 7.
Figure 9:
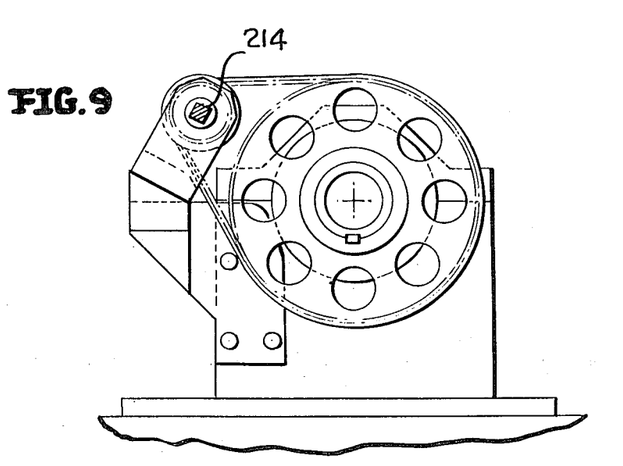
FIG. 9 is an end elevational view of the density control device taken generally along the line 9—9 of FIG. 7.

Each drive belt assembly 124 includes a pair of shafts 125, 126 which carry sprockets 127, 128 respectively which, in turn, have entrained thereover a drive belt 130. As is best shown in FIGS. 7 and 8, the shafts 125, 126 are joined by inner and outer frame members 131, 132 which have their right ends journalled on the shaft 126. The frame members 131, 132 are coupled to spaced links 133 by a pivot shaft 134 with the links 133 having their other ends journalled on the shaft 125. The unit is rigidified by a link 135 which is journalled on the shaft 125 and is coupled to the frame member 132 by a pin 136. This arrangement permits the sprockets 127, 128 to be momentarily moved together to facilitate the mounting of the belt 130 thereon.

The shafts 125 and 126 also carry links 137 which have their opposite ends pivotally mounted on a shaft 138 carried by the frame member 123. At this point it is to be understood that the shaft 125 is a fixed shaft and that the sprocket 127 is rotatably journalled thereon.

The shaft 126 also carries links 140 which correspond to the links 137 and are pivotally mounted on a shaft 141 also carried by the frame member 123. The links 127, 140 thereby provide for a parallel movement of the belt assembly.

Figure 10:
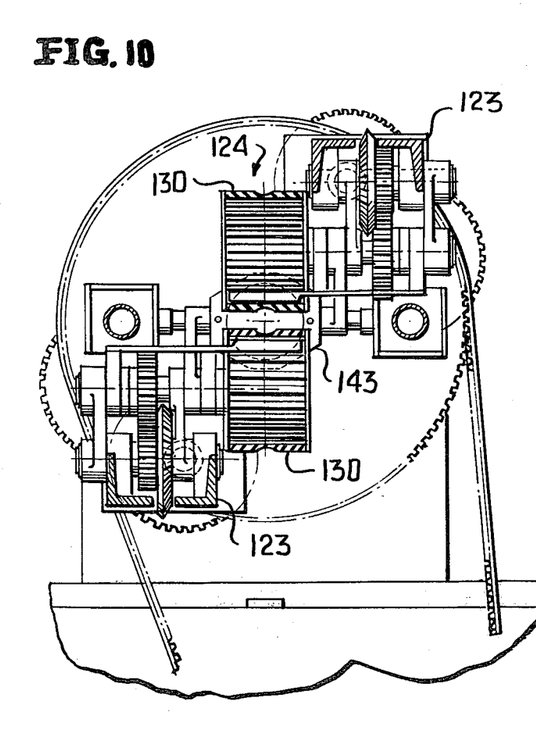
FIG. 10 is a transverse sectional view taken generally along the line 10—10 of FIG. 7, and shows specifically the details of the density control device, the usual mandrel and shirred casing having been omitted for purposes of clarity.
Figure 11:
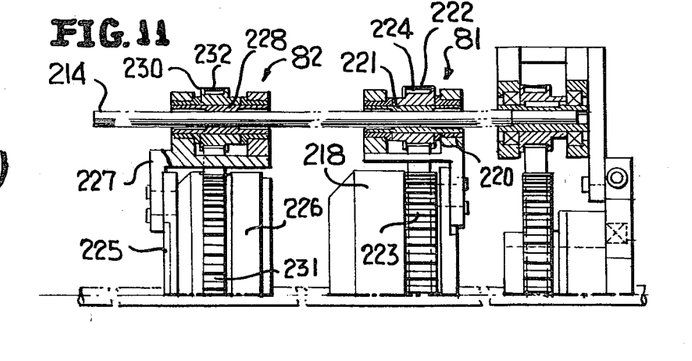
FIG. 11 is a fragmentary plan view showing the manner in which a drive from the density control device is utilized to drive a strand separator.

The shafts 126 of the two drive belt assemblies carry links 142 which are coupled to a transversely extending coupling member 143 which is provided with a central opening therethrough, as is best shown in FIG. 10. The ends of the coupling member 143 are in turn connected by links 144 of a generally Z configuration to piston rods 145 of fluid motors 146. The fluid motors 146 are individually mounted on the end plate 115 by way of suitable support brackets 147. The extreme ends of the piston rods 145 are journalled in guide blocks 148 carried by the end plate 115. It will be apparent that the coupling between the fluid motors 146 provides a controlled uniform simultaneous movement of the two drive belt assemblies 124.

At this time it is pointed out that any type of extensible or linear drive unit may be utilized.

Referring back to FIG. 7, it will be seen that the shaft 120 carries a drive sprocket 150 to facilitate the rotation thereof. On its inner end, the tubular shaft 120 carries a sun gear 151 which is part of a planetary gearing system and which sun gear drives planetary gears 152, which are rotatably journalled on stub shafts 153 carried by the end plate 115 on the external surface thereof. The gears 152 are, in turn, coupled to gears 154 for rotation therewith. The gears 154 are meshed with gears 155 which are carried by stub shafts 156 rotatably journalled in tubular housings 157 carried by the end plate 115. The opposite end of each stub shaft 156 carries a bevel pinion 158 which is meshed with a bevel gear 160. The bevel gear 160 is in turn journalled on the shaft 141 and has coupled thereto a pinion 161 which is meshed with a pinion 162 coupled to the sprocket 128.

From the foregoing it will be apparent that when the sprocket 150 is rotated to drive the tubular shaft 120, the sprockets 128 will be driven, at a reduced speed controlled by the planetary gearing, to drive the drive belts 130 at a rate which will correspond to the speed at which the shirred casing is delivered by the shirring head.

It is to be understood that the sole function of the drive belts 132 is to hold back or drive the shirred casing at a controlled speed which will control the density of the shirred casing. By controlling the density, it is meant that there will be a prescribed number of feet of casing which has been shirred per unit length of the shirred casing. It is important that density be controlled in that unit lengths of the shirred casing will be separated at a later stage and if the density varies the actual casing per casing strand will vary, and this is highly undesirable.

It is also to be understood that the frame 113 is to be rotated so as to effect a spinning of the shirred casing. The rotation of the frame 113 is effected by means of a sprocket 163 carried by the end plate and having engaged therewith a drive belt 164.

Inasmuch as the extensible motors 146 will rotate when the frame 113 is rotated, it is necessary to provide a suitable fluid coupling between a fluid source and the cylinders. To this end, the tubular extension 116 has positioned therein and secured thereto in sealed relation a sleeve 165 which together with the tubular extension 116 defines a fluid passage 166 which is sealed at its axial ends. The tubular extension 116 has suitable ports therein coupled to the inner end of the fluid passage 166 and a hose 167 extends between each cylinder 146 and a respective port.

Fluid is directed from externally of the unit into the fluid passage 166 through a collar 168 which is fixed relative to the support 111 and is provided with seals 170 on opposite sides of an annular fluid passage 171 surrounding the axially outer part of the tubular extension 116. The fluid passage 171 opens into the outer end of the fluid passage 166 and is in communication with an external fluid supply through a radial port 172. It is to be noted that opposite ends of the fluid passage 166 are of increased depth to facilitate flow into and out of the fluid passage.

Figure 12:
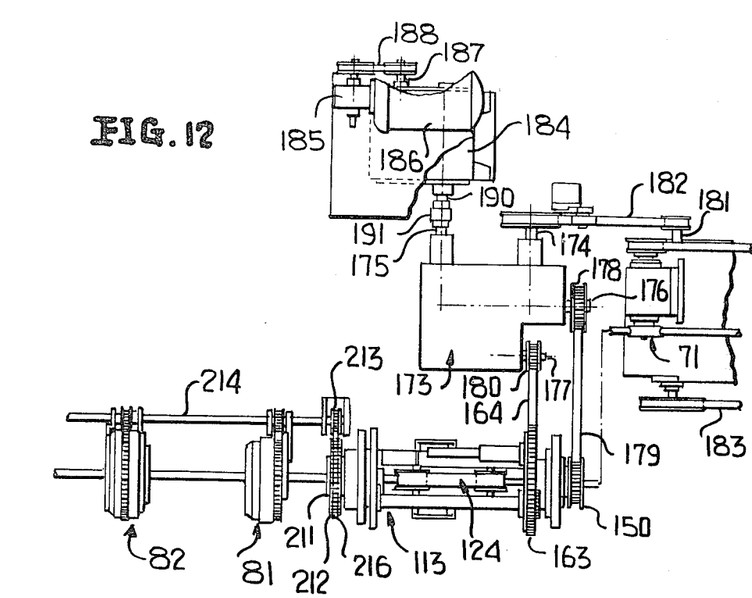
FIG. 12 is a schematic plan view showing generally the manner in which the density control device is driven both to control the density of the shirred casing and to effect a spinning thereof.

As described above, there are separate drives for effecting the driving of the drive belt assemblies 124 and the rotation of the frame 113 and the drive belt assemblies carried thereby. It will also be understood that the rotation of the frame 113 would normally affect the speed of the belts 130 in that the planetary gearing would be rotating relative to the sun gear and, depending upon the direction of rotation, would be in one instance additive and in the opposite sense subtractive. Accordingly, there is provided a differential drive generally identified by the numeral 173. The differential drive 173 has two input shafts 174 and 175 and two output shafts 176 and 177. The output shaft 176 carries a sprocket 178 which is aligned with the sprocket 150 and coupled thereto by a drive belt 179. The output shaft 177 carries a sprocket 180 which is aligned with the sprocket 163 and is coupled thereto by the belt 164.

Inasmuch as the input shaft 174 controls the speed of drive of the drive belt assemblies 124, it is essential that it be correlated to the drive for feeding the casing and for driving the shirring head. Accordingly, the input shaft 174 is driven from a shaft 181 by a drive belt arrangement 182 with the shaft 181 being driven from the main drive of the machine by a drive belt arrangement 183. Thus the drive of the input shaft 174 is directly corelated with the rate at which the casing is being shirred so that any change in speed of the shirring head 71 will result in a like speed of the drive belt assemblies 124.

The input shaft 175 is driven through a speed reducing transmission 184 from a speed reducer 185 of a drive motor 186. The speed reducer 185 is coupled to an input shaft 187 of the transmission 184 by a belt drive 188 and an output shaft 190 of the transmission 184 is coupled to the input shaft 175 by a suitable drive coupling 191.

Figure 13:
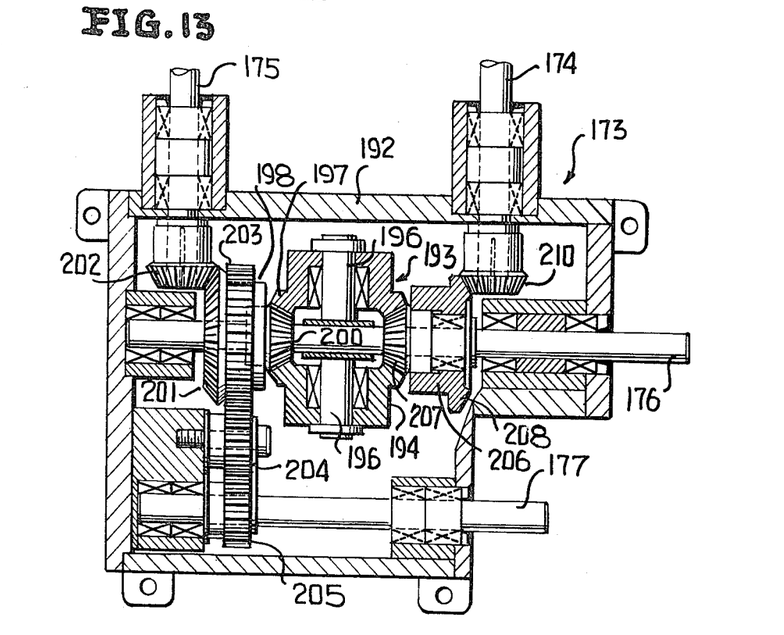
FIG. 13 is a longitudinal sectional view taken through the differential drive device for the density control device.

Reference is now made to FIG. 13 wherein the general details of the differential drive 173 are shown. The differential drive 173 includes the usual housing 192 and the input shafts 174 and 175 are journalled therein in any desired manner. In a like manner, the output shafts 176, 177 extend into the housing 192 and are journalled therein. The output shaft 176 extends entirely across the housing 192 and is provided intermediate the ends thereof with a differential drive unit generally identified by the numeral 193. The differential drive unit 193 includes a drive sleeve 194 which is fixed to the shaft 176 for driving the same. The sleeve 194 has extending in opposite directions therefrom a shaft 196 which has rotatably journalled thereon bevel gears 197.

On one side of the bevel gears 197 is a gear unit which includes a hub 198 which carries a bevel pinion 200 which meshes with the bevel gears 197. The opposite end of the hub 198 carries a bevel gear 201 which meshes with a bevel pinion 202 carried by the input shaft 175. The hub 198 further carries a pinion 203 which is meshed with an intermediate pinion 204 which, in turn, is meshed with a drive pinion 205 secured to the output shaft 177.

Finally, on the opposite side of the bevel gears 197 there is a gear unit which includes a hub 206 which carries a bevel pinion 207 which meshes with the bevel gears 197. The opposite end of the hub 206 carries a bevel gear 208 which meshes with a bevel pinion 210 carried by the input shaft 174.

The gearing of the differential drive unit 173 is such that when the input shaft 175 is stationary the output shaft 177 will also be stationary and will have no effect upon the rotational speed of the output shaft 176. However, when the shaft 175 is rotated, depending upon its direction of rotation, it will have an additive or subtractive effect on the rotational speed of the output shaft 176. This additive or subtractive effect will correspond exactly to the additive or subtractive effect of the rotation of the frame 113 on the planetary gear drive for the drive belt units 124. Thus, the differential drive unit 173 serves to provide a cancelling effect on the rotation of the frame 113 so that rotation of the frame 113 does not result in a speed-up or slow-down of the drive belts 130. It will thus be seen that once the driving of the drive belts 130 has been properly coordinated with the shirring of casing, the spinning of the casing in either direction or alternately in one direction and then the other will have no effect on the density control operation of the device.

The rotation of the frame 113 to effect the spinning of the shirred casing requires a like rotation of any subsequent equipment which will become fixedly engaged with the spinning shirred casing. To this end there is provided an auxiliary drive from the frame 113. Referring once again to FIG. 7, it will be seen that there is provided a hub 211 which is keyed to the sleeve 165 for rotation therewith. The hub 211 carries a drive sprocket 212 which is aligned with a further sprocket 213 carried by a shaft 214 which is rotatably journalled in a bracket 215 affixed to the support 111. The sprockets 213 and 212 are drivingly connected together by a belt 216.

Although a single apparatus has been provided for controlling the density of the shirred casing and for spinning the shirred casing, with the spinning and density control being simultaneously effected by the single unit, it is to be understood that there could be two separate units, one for controlling density, which unit would be fixed against rotation, and the other being a spinning unit.

What is claimed as new is:

1. A device for controlling the density of continuously shirred casing and spinning such casing, said device comprising a frame, bearing means mounting said frame for rotation about a fixed axis, at least two drive belts having spaced driving runs opposing said axis for cooperation to drive a shirred casing along said fixed axis, first drive means for driving said drive belts in unison, and second drive means for rotating said frame about said axis.

2. A device according to claim 1 together with transmission means having integrated drive mechanisms and first and second outputs, said first output being part of said first drive means and said second output being part of said second drive means.

3. A device according to claim 2 wherein said transmission means has means wherein the rotational speed of said frame may be varied without changing the drive rate of said drive belts.

4. A device according to claim 2 wherein said transmission means has first and second inputs coupled by said integrated drive mechanism to said first and second outputs, said first input including means for coupling to a drive for other feed means of a shirring machine for varying the drive rate of said drive belts in accordance with the feed rate of an associated casing fred.

5. A device according to claim 4 wherein there is a separate drive for said second input.

6. A device according to claim 4 wherein there is a separate drive for said second input, and said separate drive is controllable in speed and direction of drive for selectively varying the rate of spin and direction of spin of said frame.

7. A device according to claim 1 wherein said first drive means includes a gearing at one end of said frame, and separate outputs from said gearing for each of said drive belts.

8. A device according to claim 1 wherein each of said drive belts is carried by support means including a support, a pair of longitudinally spaced sprockets carried by said support for rotation, a respective drive belt being entrained on said sprockets, parallel arms pivotally connected to said frame and said support for facilitating movement of said support between parallel positions parallel to said fixed axis and at selected spacings from said fixed axis.

9. A device according to claim 8 together with positioning means for varying the positions of said support relative to said fixed axis.

10. A device according to claim 8 together with positioning means for varying the position of said support relative to said fixed axis and for urging said support towards said fixed axis at a preselected loading.

11. A device according to claim 8 wherein said first drive means includes a final drive gear connected to one of said sprockets and mounted for rotation about the axis of a pivot between said support and a respective one of said arms, an intermediate drive gear meshed with said final drive gear and mounted for rotation about the axis of a pivot between said respective arm and said frame wherein said support may be adjusted relative to said frame without interrupting the drive to the respective drive belt.

12. A device according to claim 11 wherein said first drive means includes a planetary gearing at one end of said frame, and separate outputs from said planetary gearing for each of said drive belts.

13. A device according to claim 12 wherein each of said planetary gearing outputs includes a drive shaft having one axis parallel to said fixed axis, and gearing coupling each drive shaft to a respective intermediate gear.

14. A device according to claim 1 together with an output drive coupled to said frame for rotating other components about said fixed axis at the same rotational speed as said frame.

15. A device according to claim 8 wherein said support means for each drive belt is formed of pivotally connected parts whereby said sprockets may be moved together for belt replacement, and means normally holding said pivotally connected parts in a rigid extended state to hold said sprockets in spaced belt tensioning relation.

* * * * *